P. F. KING.
Nut and Bolt Fastenings.

No. 141,877.             Patented August 19, 1873.

WITNESSES.
J. W. Herthel
Chas. Meisner.

INVENTOR.
Phineas F. King.
per Herthel & Co.
atty's.

UNITED STATES PATENT OFFICE.

PHINEAS F. KING, OF ST. LOUIS, MISSOURI.

IMPROVEMENT IN NUT AND BOLT FASTENINGS.

Specification forming part of Letters Patent No. 141,877, dated August 19, 1873; application filed May 19, 1873.

*To all whom it may concern:*

Be it known that I, PHINEAS F. KING, of St. Louis, Missouri, have invented an Improved Nut Lock or Bolt, of which the following is a specification:

This invention consists, chiefly, of a screw-bolt made in two sections or halves, and providing each half or bolt with a nut, and reversing the parts in opposite directions to obtain a perfect "dead-lock."

Figure 1:
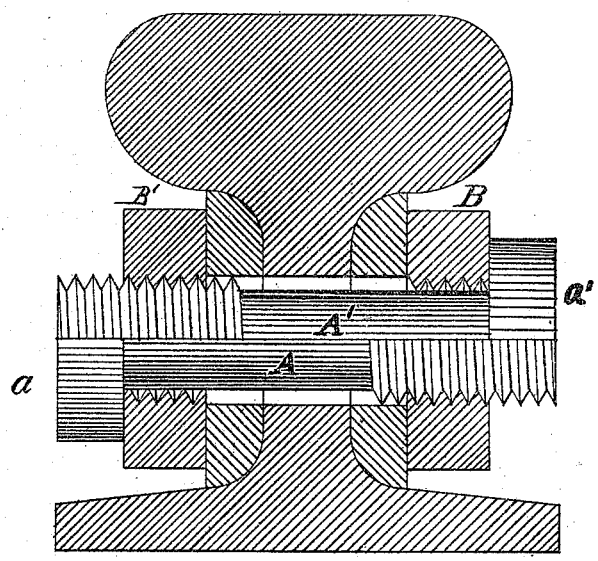
Figure 2:
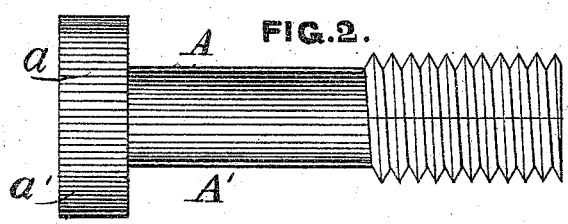
Figure 3:
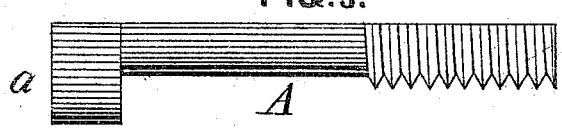

Of the drawing, Figure 1 shows the nut lock or bolt applied to a fish-bar connection; Fig. 2, the two halves or bolts placed together; Fig. 3, a half or independent bolt as made.

A is the half of bolt, made of half-round iron, with screw-threaded end and with a half-head, *a*. A' is fac-simile half-bolt with screw-threaded end and half-head *a'*. B B' are the nuts, fitted to engage the screw-threaded ends.

For lock-nut uses the halves A A', with nuts B B' thereon, are reversed and inserted contiguously to each other. (See Fig. 1.) This brings each half-head *a a'* on the outer sides of the nuts B B'. To complete the lock, each nut B B' is turned at the same time, but in opposite directions, until said nuts are locked between the connections and the heads. Thus locked, the nuts B B' are held in place; and as the action of one of the nuts is expended upon the opposite half-bolt and nut, and, vice versa, the opposite nut upon the opposite half-bolt and nut, no possible self-unlocking can take place, one movement in one direction checking the movement in the other direction. Also, no rotating action of the bolts or halves under any circumstances, after the lock is made, can loosen or produce an unlocking action independent of the working of the nuts, nor any separate action of either nut, after locking, unlock the other. Further, as the same locking action of the nuts and bolts must take place to produce an unlocking action, and as this action is vice versa, it is plain that no jar, concussion, or vibration, or pressure, such as is generally brought to bear upon bolts, can be of the nature here required to produce a self-unlocking of the device.

The action of the parts, turning circularly in opposite directions, effectually produces a dead-lock.

The half-bolt A or A', with nuts B B', can be used as independent bolts; or, placed together, they make a common bolt in form, (see Fig. 2,) with the additional advantage and effect of greater strength obtained from being a "split bolt."

The advantages of the above locking device are, its simplicity, ready construction, and application.

I claim—

1. Two half-bolts, provided with nuts, and arranged to operate in opposite directions with relation to each other, as and for the purpose set forth.

2. The combination of the parts A A', having heads *a a'*, nuts B B', as and for the purpose set forth.

In testimony of said invention I have hereunto set my hand.

PHINEAS F. KING.

Witnesses:
 WILLIAM W. HERTHEL,
 CHAS. MEISNER.